Dec. 9, 1924.                                                   1,518,601
                        M. O'DAY
        HOLDER FOR CABLES, CLOTHESLINES, AND THE LIKE
                    Filed Jan. 19, 1924

Michael O'Day
INVENTOR

BY Victor J. Evans
ATTORNEY

WITNESS:

Patented Dec. 9, 1924.

1,518,601

UNITED STATES PATENT OFFICE.

MICHAEL O'DAY, OF BRIDGEPORT, CONNECTICUT.

HOLDER FOR CABLES, CLOTHESLINES, AND THE LIKE.

Application filed January 19, 1924. Serial No. 687,328.

*To all whom it may concern:*

Be it known that I, MICHAEL O'DAY, a citizen of United States of America, residing at Bridgeport, in the county of Fairfield and State of Connecticut, have invented new and useful Improvements in Holders for Cables, Clotheslines, and the like, of which the following is a specification.

This invention relates to a holder for cables, clothes lines and the like, the general object of the invention being to provide means for firmly holding the ends of a cable and rendering it unnecessary to tie knots therein.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
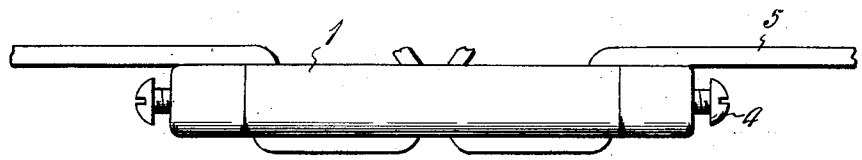
Figure 1 is an edge view showing the device in use.
Figure 2:
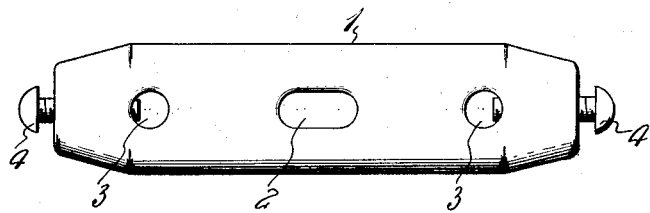
Figure 2 is a face view of the holder.
Figure 3:
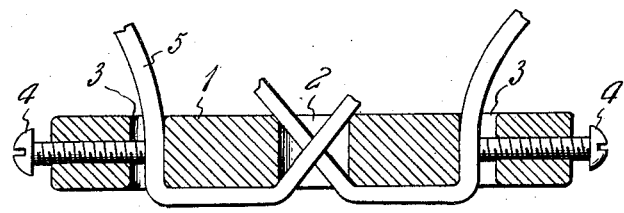
Figure 3 is a view showing how the cable is placed in the holder.

In these views, 1 indicates a block which has tapered ends and which is provided with an elongated slot 2 in its center and a hole 3 adjacent each end thereof. A set screw 4 passes through each end of the device with its end entering the hole 3. The cable 5 is passed through the slot and then through one of the holes 3 and is clamped in said hole by the set screw. The other end of the cable is then passed through the slot and crosses the other cable therein and through the other hole and is clamped therein by the set screw in this hole. Thus the cable is firmly held by the holder so that it cannot slip and there are no unsightly knots to tie and untie.

It is thought from the foregoing description that the advantages and novel features of my invention will be readily apparent. If desired, the device may be successfully employed for taking up the slack of a single cable by permitting the loop formed by the slack to pass through the slot 12.

I desire it to be understood that I may make changes in the construction and in the combination and arrangement of the several parts, provided that such changes fall within the scope of the appended claim.

What I claim is:—

In combination with the meeting ends of a pair of flexible cables, of a device comprising a body having a slot in its center and a hole adjacent each end thereof, the ends of said cables passing through said slot and crossing therein and extending through said holes, and screws passing through the ends of said body for clamping the ends of the cables against the walls of said holes.

In testimony whereof I have affixed my signature.

MICHAEL O'DAY.